United States Patent Office 2,891,927
Patented June 23, 1959

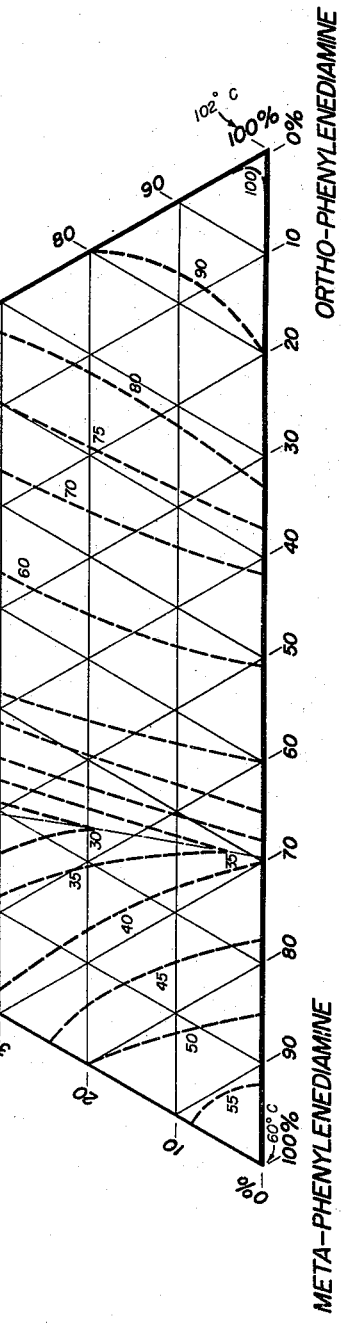

2,891,927
METHOD AND COMPOSITION FOR CURING EPOXY RESINS

Joseph Philipson, Pasadena, Calif., assignor to Chemical Process Company, San Francisco, Calif., a corporation of Nevada Application March 29, 1956, Serial No. 574,762

5 Claims. (Cl. 260—47)

This invention relates to the curing of epoxy resins, and more particularly to a method and composition for providing a cured epoxy resin that has excellent strength retention at high temperatures.

Epoxy resins are widely employed as structural plastics and adhesives because of their high strength, resistance to chemicals, and strong adhesive properties. As is well known in the art, these resins are condensations of organic epoxides with dihydric compounds, and they may be cured to form strong resins of high molecular weight by reaction with curing agents, such as amines and acid anhydrides.

Amines have been extensively employed as curing agents for epoxy resins because of the desirable properties which they impart to the cured resin. Liquid amines, such as diethylene triamine, are particularly useful since they can be mixed with a liquid epoxy resin at room temperature, and the mixture forms at room or elevated temperatures a solid high molecular weight resin. However, the amine curing agents which have been used heretofore and which are liquid at room temperature provide cured epoxy resins that have low heat distortion points, generally in the order from 60° C. to 90° C., even though the other properties of resins cured with liquid amines are excellent.

It is known that aromatic polyamines, such as meta-phenylenediamine, are effective in curing epoxy resins to provide a resinous structure having superior strength at high temperatures. However, such aromatic polyamines have melting points well above room temperature, and they must be melted and mixed with a heated epoxy resin at elevated temperatures in order to provide a homogeneous liquid mixture that effects uniform curing of the resin. The necessity of employing elevated temperatures for mixing the polyamine curing agent with the epoxy resin is a serious disadvantage in many fields because the pot life of the resin is greatly shortened at high temperatures. This is a particular problem when large volumes of resin are cured, since it is difficult to mold or otherwise utilize the large volumes of resin before the resin sets to a hard mass. Furthermore, the aromatic polyamines are generally unpleasant to work with at elevated temperatures, and it is inconvenient to be required to heat the curing agent and epoxy resin in order to mix them together.

This invention overcomes the problem that is encountered with high melting point curing agents by providing a curing agent which is in the liquid state at a relatively low temperature, preferably at room temperature, and which also possesses the property of providing a cured solid epoxy resin that has high strength retention at elevated temperatures. The curing agent should have a melting point well below the 60° C. melting point of meta-phenylenediamine, which is one of the lowest melting point aromatic diamines heretofore used to provide good high temperature properties in the cured resin. As previously stated, the curing agent should desirably be a liquid at room temperatures, or in other words it should have a melting point below 25° C. to enable it to be mixed with the epoxy resin without the application of heat. Also, the provision of a curing agent having a relatively low melting point should be accomplished without affecting the ability of the curing agent to provide a cured epoxy resin having good high temperature strength retention properties.

To summarize this invention, an epoxy resin is cured to a hard, solid, resinous material with excellent strength retention at high temperatures by mixing the epoxy resin with a liquid curing agent comprising a mixture of at least three aromatic diamine compounds. By thus mixing at least three of said aromatic diamines, the resultant curing agent mixture has a melting point markedly below the melting point of any of the constituent diamines therein. In such curing agent mixture of at least three aromatic polyamines, the sum of the melting points of the three lowest melting point diamines should for best results be as low as possible and preferably is below about 235° C., and preferably none of the aromatic diamines should have a melting point above about 115° C. Superior results are provided with an eutectic mixture of aromatic diamines, but a mixture of any three aromatic polyamine compounds can be employed to obtain a curing agent of relatively low melting point compared to the melting points of the individual polyamine compounds and to provide a high heat distortion point in the cured resin.

By curing liquid epoxy resins with a diamine mixture of at least three aromatic diamines in accordance with this invention, the epoxy resin and the curing agent may be mixed as liquids at substantially lower temperatures than are employable with the other curing agents heretofore used to provide good high temperature strength retention properties in the cured resin. As a result, the working life of a mixture of an epoxy resin and the low melting point curing agent hereof is considerably extended. Furthermore, it is far more convenient to mix the resin and curing agent at substantially room temperatures without the necessity of applying heat, than to mix the components at elevated temperatures in order to maintain them in the liquid state.

Also, the advantageous results provided by employing the method and composition of this invention are obtained without reducing the high temperature strength retention properties of the cured resin. Furthermore, epoxy resins cured by the aromatic diamine mixtures hereof maintain their electrical properties for extended periods of time at relatively high temperatures. If substantial amounts of compounds other than the aromatic diamines hereof are mixed with an aromatic diamine in order to provide a curing agent mixture having a reduced melting point, epoxy resins cured with such curing agent mixtures suffer a resultant decrease in their high temperature properties.

This invention is particularly valuable to industries that employ epoxy resins in large quantities, and which require that the cured resins have high heat distortion points. For example, the aircraft industry makes extensive use of epoxy resins in structural parts such as radar domes. Heat generated on the aircraft surfaces at high speeds causes such domes to become distorted and weakened unless a resin maintaining sufficient strength at elevated temperatures is employed, such as an epoxy resin cured by the curing agent mixture of this invention. Consequently, the curing agent and method hereof have found immediate acceptance by the aircraft industry because of the high temperature properties imparted to the epoxy resins, combined with the ease of mixing the liquid curing agent with a liquid epoxy resin at room temperature. Another use of epoxy resins in which resins should have good high temperature properties is in the potting of electrical circuits in accordance with a procedure now commonly employed in high frequency electronics. Delicate electronic circuits embedded in epoxy resins cured by the method hereof are well protected since the resin does not become distorted even when heated to relatively high temperatures.

The drawing is a three component phase diagram of a curing agent hereof composed of meta-phenylenediamine, ortho-phenylenediamine, and 4-chloro-orthophenylenediamine. Isothermal lines in degrees centigrade indicate the melting points of all combinations of the three diamine components of the mixture. The diagram clearly illustrates that the mixtures of the three aromatic polyamines are readily provided that have melting points below the melting point of any of the components of the mixture; and that a eutectic mixture having a melting point of about 15° C. is provided by 45% by weight of meta-phenylenediamine, 45% by weight 4-chloro-orthophenylenediamine, and 10% by weight orthophenylenediamine. Mixtures of the three components having melting points below 25° C., or in other words within the 25° C. isotherm may be readily selected from the phase diagram.

In greater detail, the epoxy resins that may be cured to form high molecular weight resins with high heat distortion points by the method and composition of this invention are formed by the condensation of organic epoxides with dihydric compounds. Epichlorohydrin is the organic epoxide most commonly employed in the preparation of epoxy resins, and it is usually condensed with bisphenol A as the dihydric compound. However, as is well known in the art, other organic epoxides, and other dihydric compounds such as resorcinol, may be condensed to form epoxy resins.

Epoxy resins are generally prepared by heating the organic epoxides and dihydric compounds such as epichlorohydrin and bisphenol A at 90° C. to 100° C. in the presence of alkaline catalyst. The method of preparing these resins is described in greater detail in Chapter X of a book entitled "Copolymer Processes," edited by C. E. Schildknecht, and published by Interscience Publishers, 1956. The amount of epichlorohydrin employed depends upon the desired molecular weight of the epoxy resin. Two moles of epichlorohydrin per mole of bisphenol A provides a liquid condensate of low molecular weight. As the proportion of epichlorohydrin is decreased the molecular weight of the epoxy resin is correspondingly increased.

Many different companies manufacture and sell epoxy resins in both liquid and solid form, and molecular weights of such commercially available resins range between about 300 to 8000. Generally, epoxy resins having molecular weights above 8000 have limited commercial use because of the high melting point of such high molecular weight epoxy resins. Shell Chemical Corporation sells epoxy resins under the trademark "Epon," and the Epon resins are designated by different numbers depending upon the molecular weight of the epoxy resin. For example, Epon 828 is an epoxy resin having an average molecular weight of about 390 and a melting point of from 8° C. to 12° C. This invention is particularly directed to the curing of epoxy resins, such as Epon 828, that are liquids at room temperature, since such resins can be advantageously cured by mixing them with the liquid amine curing agents hereof and neither the resin nor the curing agent need be heated to convert it into the liquid state.

Unless the epoxy resins are treated with curing agents, the resins have little commercial use. The curing agents convert the resins to strong polymers by reacting with the resins to form large resinous molecules. When an epoxy resin is cured by the curing agent composition of this invention, the resin cures to form a thermoset resinous polymer of high molecular weight that has a high heat distortion point.

The curing agent hereof comprises a mixture of at least three aromatic diamine compounds. As employed herein, the term aromatic diamine designates an aromatic compound having at least two amine nitrogen atoms. Either unsubstituted or substituted diamines may be utilized in the curing agent mixture hereof. Suitable diamines include meta-phenylenediamine; ortho-phenylenediamine; 4-chloro orthophenylenediamine; 4,4' methylene dianiline; 2,4 diamino toluene; 1 chloro 2,4 diamino benzene; and 2,6 diamino toluene.

Examples of substituent groups that may also be present on aromatic nuclei in the aromatic diamine curing agent mixtures hereof are amino groups, which transform the diamine aromatic compounds into triamines, halogen atoms, nitro groups, and nitroso groups, as well as relatively small alkyl, aryl, ester, and ether groups. Also, substituted amines in which the amine hydrogen is replaced by substituent groups such as short chain alkyl groups or halogen groups, may be employed. However, acid or anhydride constituent groups should preferably not be attached to the aromatic polyamines in the curing agent since such groups substantially reduce the curing properties of the amine curing agent hereof.

At least three aromatic diamines are employed in accordance with this invention to obtain the desired low melting point curing agent mixture. It has been found that aromatic diamine compositions containing less than three of such diamines do not provide a curing agent that has a true melting point below the preferred maximum melting point of 25° C., or in other words, below room temperature. If compounds other than aromatic diamines are employed to replace completely one or more of the three aromatic diamines in the mixture, the resultant high temperature strength retention properties of the cured resin are decreased corresponding to the amount of such other compounds present.

Many mixtures of only two aromatic diamines provide compositions that remain liquid at room temperature for appreciable periods due to super-cooling, even if such mixtures do not have true melting points below the room temperatures that are encountered. However, such super-cooled liquids eventually solidify, and it is never certain how long super-cooled curing agents will remain liquid. The curing agent mixtures hereof that have true melting points below room temperature provide compositions which always remain liquid at the room temperatures and conditions under which they are utilized. As a result, such three component mixtures have important advantages for commercial purposes.

As previously stated, in order to provide a curing agent mixture that has the desired melting point below room temperature, the sum of the melting points of three of the aromatic diamines in the mixture should be below about 235° C., and none of the melting points of said three diamines should be above about 115° C. Generally, the aromatic polyamine in the mixture that has the highest melting points should constitute less than 50 percent of the curing agent mixture. The desired mixture of the aromatic diamines that provides a composition having a melting point below 25° C. may readily be selected from a phase diagram of the components of the mixture, such as illustrated in the drawing.

A phase diagram of the components of the curing agent mixture with isothermal lines indicating the melting points of all combinations of the aromatic diamines, clearly illustrates the substantial lowering of the melting point of mixtures of three aromatic diamines compared to the melting points of the individual components of the mixture. Such phase diagrams are obtained by plotting melting point determinations of various test mixtures of the components in the manner customarily practiced in the art. As previously explained, it is most advantageous to employ a curing agent mixture that has a melting point sufficiently below 25° C. so that it will be a liquid and can be easily mixed with a liquid epoxy resin at room temperature.

Best results are obtained when a eutectic mixture of the three aromatic diamines is employed as the curing agent since such a mixture provides an invariant composition. If a mixture is employed that is not eutectic mixture, there is always a possibility that low temperatures will solidify a portion of the mixture and leave only a low melting point composition in the liquid state. Withdrawal of liquid from such a combined mixture of liquid and solid results in an increase in the proportion of the solidified high melting point constituent which remains in the mixture, and the overall melting point of the remaining mixture is increased until it has a melting point much higher than that of the original mixture. Another advantage of using a eutectic mixture is that the possibility of preparing polymers which have inferior high temperature characteristics from either the liquid or solid phases resulting from partial crystallization in the curing agent is avoided. The cured polymers may be inferior in their high temperature properties because the changed curing agent composition should for best results generally be mixed with the epoxy resins in different proportions than the original curing agent mixture.

An example of the use of a three component phase diagram is illustrated in the drawing. The melting point of any mixture of meta-phenylenediamine, ortho-phenylenediamine and 4-chloro-orthophenylenediamine can be readily determined from the isothermal lines which give the true melting points in degrees centigrade. The melting point of pure metaphenylenediamine is about 60° C., the melting point of ortho-phenylenediamine is about 102° C., and the melting point of 4-chloro-orthophenylenediamine is about 61.4° C. It is apparent that a curing agent is provided having a substantially lower melting point than that of the individual components by employing a three component mixture containing predominant amounts of the low melting point compounds, meta-phenylenediamine, and 4-chloro-orthophenylenediamine. In order to obtain the desired curing agent mixture that has a melting point below 25° C. so that it is liquid at room temperature, the proportions may be taken directly from the points within the 25° C. isotherm in the phase diagram.

As can readily be deduced from the phase diagram, curing agent mixtures which have melting points below 25° C. are provided by mixtures of from about 32 to 50 percent by weight meta-phenylenediamine, about 34 to 54 percent by weight 4-chloro-orthophenylenediamine, and orthophenylenediamine present in an amount up to about 18 percent by weight. The eutectic point, which is the melting point of the resultant mixture, is indicated by the 15° C. mark, and it is provided by a mixture of 45 percent by weight meta-phenylenediamine, 45 percent by weight 4-chloro-orthophenylenediamine, and 10 percent by weight orthophenylenediamine. Such a liquid eutectic mixture is extremely valuable for use in curing liquid epoxy resins by simply mixing the resin and the curing agent at any normal room temperature above 15° C.

The phantom lines from the eutectic point through the corners of the triangular isothermal melting point curves to the sides of the phase diagram, indicate the proportions of two components of the mixture that provide the lowest melting point composition as the amount of the third component is reduced below the amount present in a eutectic mixture. For example, the line from the eutectic point leading through the corners of the isotherms to the bottom side of the phase diagram indicates the proportions of meta-phenylenediamine to ortho-phenylenediamine that provide the lowest melting point mixtures as the amount of 4-chloro-orthophenylenediamine is decreased.

Other aromatic diamines may be mixed with the three component mixture hereof to provide a curing agent that has a desirably low melting point, and epoxy resins cured by such curing agents have good strength retention at high temperatures. For example, a curing agent that is liquid at room temperatures is obtained by mixing up to 50 percent by weight of the commercial stripped grade of 4,4' methylenedianiline with a eutectic mixture of at least 50 percent by weight of the curing agent mixture in the drawing, namely 45 percent by weight meta-phenylenediamine, 45 percent by weight 4-chloro-orthophenylenediamine and 10 percent ortho-phenylenediamine. Small quantities of liquid other than aromatic diamines added to the curing agent mixture hereof do not greatly affect the properties of the curing agent. However, if any appreciable amount of miscible liquid compounds other than aromatic amines are incorporated in the curing agent mixture, the ability of the curing agent to impart good high temperature properties to epoxy resins is appreciably diminished. Nevertheless, substantial amounts of suitable amine salts of aromatic diamines may be incorporated in the curing agent mixture hereof without detracting from the advantageous properties which the curing agent imparts to epoxy resins.

When it is desired to harden the epoxy resin, it is mixed with the curing agent mixture hereof. As previously discussed, the resin and curing agent are mixed in liquid form. Consequently, the use of curing agents and epoxy resins that are liquid at room temperature is the most advantageous method of curing the resin. Since the amines cure epoxy resins by a stoichiometric reaction in which the epoxy groups on the resin are cross-linked, sufficient curing agent is mixed with the epoxy resin to provide about one curing agent amino group for each epoxy group in the epoxy resin. Since there are two epoxy groups in each molecule of epoxy resin, the amount of curing agent is readily computed in a well known manner. The amount of curing agent employed for curing the resin is generally expressed in the trade in terms of parts by weight curing agent per hundred parts of resin. Usually from between about 5 to 25 parts by weight curing agent per hundred parts of epoxy resin is employed depending upon the particular resin and curing agent utilized. In each case the stoichiometric amount of curing agent is preferably used since too little curing agent leaves an epoxy resin that is not completely cross-linked. This uncross-linked epoxy resin acts as a diluent and it weakens the final resinous product. On the other hand, too much curing agent adversely affects the electrical properties of the cured epoxy resin, and also reduces the strength of the cured resin.

Examples of curing agent mixtures hereof suitable for this invention, that have melting points and therefore are in liquid form at a temperature below 10° C. are as follows in parts by weight:

| | Percent |
|---|---|
| Meta-phenylenediamine | 27 |
| 4-chloro orthophenylenediamine | 27 |
| Ortho-phenylenediamine | 6 |
| 4,4' methylenedianiline | 40 |
| | 100 |

| | |
|---|---|
| 2,4 diaminotoluene | 6 |
| Meta-phenylenediamine | 27 |
| 4-chloro orthophenylenediamine | 27 |
| 4,4' methylenedianiline | 40 |
| | 100 |

| | |
|---|---|
| 4,4' methylenedianiline | 40 |
| Meta-phenylenediamine | 25 |
| 1 chloro-metaphenylenediamine | 25 |
| Ortho-phenylenediamine | 10 |
| | 100 |

The curing agent mixture is prepared simply by mixing the aromatic diamines in the desired proportions at a temperature sufficiently high to render the mixture liquid. Generally, a temperature of about 70° C. to 80° C. is sufficient to provide for the formation of a homogeneous liquid curing agent mixture of the aromatic amines hereof even if one of the aromatic amines has a higher individual melting point than the mixing temperature. After a homogeneous preferred mixture of the three aromatic diamines has been formed, the mixture acquires a melting point lower than that of the constituent amines, and does not solidify when cooled below the mixing temperature. For example, the eutectic mixture shown in the drawing is mixed at 70° C. in order to provide the homogeneous curing agent mixture, and thereafter the mixture does not solidify until the temperature falls below 15° C.

After the epoxy resin has been mixed with the curing agent, the mixture may be poured into any suitable shape of mold in which it sets to a hard mass, it can be used for laminating material such as fiberglass, or it may be employed in any of the other usual applications of epoxy resins. The curing reaction may be speeded up by heating the mixture. Although the times and temperatures of heating are not critical, the optimum in high temperature strength of the cured resin is provided by heating the mixture of resin and curing agent to between about 175° C. to 225° C. for at least an hour during the curing reaction.

The following are specific examples of the curing agents of this invention, and of the use of such curing agents for reacting with epoxy resins to form high molecular weight, strong resinous materials that have excellent strength retention at high temperatures:

*Example 1*

A curing agent mixture of three aromatic diamines was formed by mechanically stirring the following compounds in a reaction kettle at a temperature of about 70° C.:

| | Percent by weight |
|---|---|
| Meta-phenylenediamine | 45 |
| Ortho-phenylenediamine | 10 |
| 4-chloro-orthophenylenediamine | 45 |
| | 100 |

When a homogeneous liquid mixture was formed, the mixture was allowed to cool to a room temperature of 22° C. The melting point of the mixture was 15° C.

Seventeen parts by weight of the above liquid aromatic diamine curing agent mixture was then mixed at room temperature with one hundred parts by weight of a liquid epoxy resin sold by Shell Chemical Corporation under the name Epon 828. This epoxy resin was formed by condensing epichlorohydrin with bisphenol A. It has an average molecular weight of about 390, and a melting point between 8–12° C.

Glass cloth was then impregnated with the above mixture of epoxy resin and curing agent by spreading about 40 percent by weight resin on 60 percent by weight glass cloth. A structure of layers of glass cloth impregnated with the mixture of resin and curing agent was placed in a mold and shaped under light pressure sufficient to squeeze out entrapped air to form a radome for use on high speed aircraft. Cellophane lining in the mold prevented the epoxy resin from becoming adhesively united to the mold surfaces upon curing of the resin. The curing process was hastened by heating the impregnated glass cloth for one hour at 120° C., and then for an additional hour at 200° C. The resultant strong laminated structure retained its strength and electrical properties at elevated temperatures.

*Example 2*

A conduit for carrying hot water was prepared by curing an epoxy resin with an aromatic diamine curing agent in accordance with this invention. The curing agent mixture was prepared by mixing the following aromatic diamine compounds in a reaction kettle at a temperature of about 80° C.:

| | Percent by weight |
|---|---|
| 4,4' methylenedianiline | 40 |
| Meta-phenylenediamine | 27 |
| 4-chloro-orthophenylenediamine | 27 |
| Ortho-phenylenediamine | 6 |
| | 100 |

After a homogeneous liquid mixture of the diamines was formed at 80° C., the mixture was permitted to cool to the room temperature of 21° C., at which temperature the mixture remained in the liquid state.

Seventeen parts by weight of the above aromatic amine liquid curing agent mixture was then thoroughly intermixed at room temperature with one hundred parts of the liquid epoxy resin employed in Example 1. A yarn-type glass fiber filament of fiber glass roving was then passed through the liquid mixture of epoxy resin and curing agent, and wound on a spinning mandrel to form a pipe shaped structure. This procedure is known in the art as the filament winding process. The wound glass filament was then heated for two hours at about 225° C. to accelerate the curing process.

After the two hour heating step, the wound filament was withdrawn from the mandrel. The epoxy resin on the filament had cured to form a solid strong conduit in which the filament was firmly bound by the set resin. The conduit had excellent strength retention when water was passed through it at temperatures of 95° C.

I claim:

1. In the curing of a 1,2 epoxy resin which is a polyglycidyl ether of a dihydric phenol, in which an aromatic diamine curing agent is employed, the method of curing by which said epoxy resin and said curing agent can be mixed as liquids at substantially room temperature which comprises providing a liquid aromatic diamine curing agent containing three aromatic diamines in which the sum of the melting points of said aromatic diamines is below about 235° C., and in which none of said three aromatic diamines has a melting point above about 115° C., said aromatic diamines being selected from the group consisting of meta-phenylenediamine; ortho-phenylenediamine; 4-chloro orthophenylenediamine; 4,4' methylene dianiline; 2,4 diamino toluene; 1 chloro 2,4 diamino benzene; and 2,6 diamino toluene, and the relative amounts of each of said three aromatic diamines being represented by any point within the 25° C. isotherm of the phase diagram of said three diamines thereby providing a curing agent which is permanently in liquid form at temperatures down to 25° C., and mixing at substantially room temperatures from about 5 to 25 parts by weight of said liquid curing agent per 100 parts by weight of said epoxy resin to cure said resin and provide a solid high molecular weight resinous material.

2. The method of claim 1 in which said liquid curing agent mixture is a eutectic mixture of said three aromatic diamines.

3. The method of claim 1 in which said liquid curing agent mixture comprises about 32 to 50 percent by weight meta-phenylenediamine, about 34 to 54 percent by weight 4-chloro-orthophenylenediamine, and ortho-phenylenediamine present in an amount up to about 18 percent by weight, said percentages by weight being based upon the total weight of said meta-phenylenediamine, 4-chloro-orthophenylenediamine, and ortho-phenylenediamine in said composition, the relative amounts of each constituent in said curing agent composition being represented by any point within the 25° C. isotherm on the annexed phase diagram.

4. The method of claim 1 in which said curing agent mixture comprises about 32 to 50 percent by weight meta-phenylenediamine, about 34 to 54 percent by weight 4-chloro-orthophenylenediamine, and ortho-phenylenediamine present in an amount up to about 18 percent by weight, and 4,4' methylene dianiline is added to said curing agent mixture in an amount up to 50 percent by weight of the total weight of said aromatic diamine mixture and said 4,4' methylene dianiline.

5. A liquid aromatic diamine curing agent for curing a 1,2 epoxy resin which is a polyglycidyl ether of a dihydric phenol, said curing agent containing a diamine mixture of three aromatic diamines in which the sum of the melting points of said aromatic diamines is below about 235° C., and in which none of said three aromatic diamines has a melting point above about 115° C., said aromatic diamines being selected from the group consisting of meta-phenylenediamine; ortho-phenylenediamine; 4-chloro ortho-phenylenediamine; 4,4' methylene dianiline; 2,4 diamino toluene; 1 chloro 2,4 diamino benzene; and 2,6 diamino toluene, and the relative amounts of each of said three aromatic diamines being represented by any point within the 25° C. isotherm of the phase diagram of said three diamines thereby providing a curing agent which is permanently in liquid form at temperatures down to 25° C. whereby said epoxy resin and said curing agent can be intermixed in liquid form at substantially room temperatures for curing said epoxy resin.

References Cited in the file of this patent
UNITED STATES PATENTS

| | | |
|---|---|---|
| 2,643,239 | Shokal et al. | June 23, 1953 |
| 2,651,589 | Shokal et al. | Sept. 8, 1953 |
| 2,801,229 | De Hoff et al. | July 30, 1957 |